United States Patent [19]

Meltsch

[11] Patent Number: 4,717,608
[45] Date of Patent: Jan. 5, 1988

[54] TERMINATING PART MADE OF SHRINKABLE MATERIAL FOR CLOSING OPEN ENDS AND CABLE FITTINGS, CONDUITS AND SOCKETS

[75] Inventor: Hans-Juergen Meltsch, Schwerte-Ergste, Fed. Rep. of Germany

[73] Assignee: RXS Schrumpftechnik-Garnituren GmbH, Fed. Rep. of Germany

[21] Appl. No.: 828,534

[22] Filed: Feb. 12, 1986

[30] Foreign Application Priority Data

Feb. 27, 1985 [DE] Fed. Rep. of Germany ....... 3506990

[51] Int. Cl.⁴ .................. B65D 59/06; H02G 15/02
[52] U.S. Cl. .................................. 428/35; 174/74 A; 174/DIG. 8; 138/89; 138/96 R; 156/86
[58] Field of Search .............. 174/74 A, DIG. 8; 138/89, 96 R, 96 T; 285/381; 428/36, 35; 156/86

[56] References Cited

U.S. PATENT DOCUMENTS

| | | | |
|---|---|---|---|
| 2,674,647 | 4/1954 | Dibner | 174/74 A |
| 3,200,984 | 8/1965 | Fueslein et al. | 138/89 |
| 3,869,189 | 3/1975 | McCurdy | 339/96 |
| 4,297,155 | 10/1981 | Jervis | 174/74 A |
| 4,467,137 | 8/1984 | Paget et al. | 428/36 |
| 4,569,868 | 2/1986 | De Blauwe et al. | 138/96 R |

FOREIGN PATENT DOCUMENTS

| | | |
|---|---|---|
| 0086110 | 8/1983 | European Pat. Off. . |
| 2018274 | 10/1971 | Fed. Rep. of Germany . |
| 3124374 | 5/1985 | Fed. Rep. of Germany . |
| 7625078 | 3/1977 | France . |
| 2369912 | 6/1978 | France . |

Primary Examiner—John E. Kittle
Assistant Examiner—James J. Seidleck
Attorney, Agent, or Firm—Hill, Van Santen, Steadman & Simpson

[57] ABSTRACT

A terminal assembly or part for closing a conduit opening in a fitting, conduit socket or conduit includes a shrink tube having one end shrunk onto the conduit opening and the opposite end closed by an end part which may include a supporting element. In one embodiment, additional supporting elements are provided besides the supporting element of the end part. If an elongated object is to be inserted into the opening, at least a portion of the end part is removed to enable insertion of the elongated object such as a cable with the removal being accomplished without damaging any of the shrink tube so that a subsequent heat-shrinking of the tube onto the inserted elongated object will form a sealing closure with the object as the remains of the end part are expelled from the assembly.

33 Claims, 13 Drawing Figures

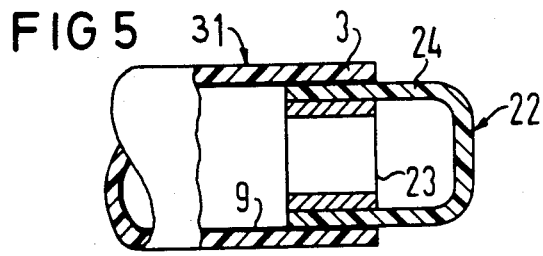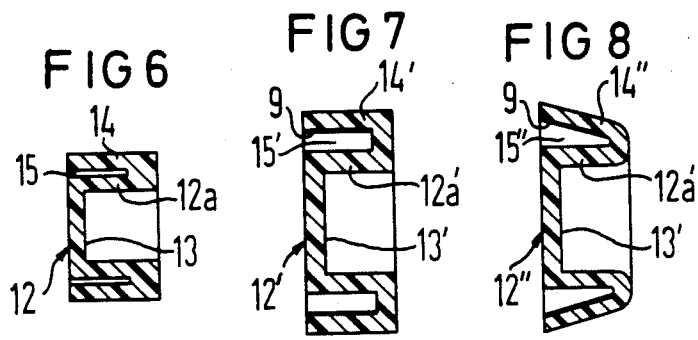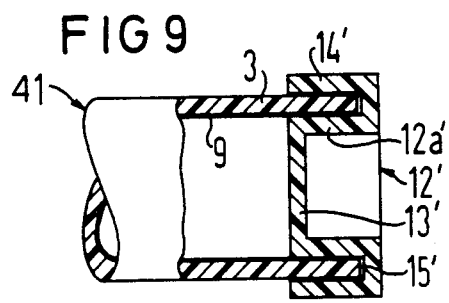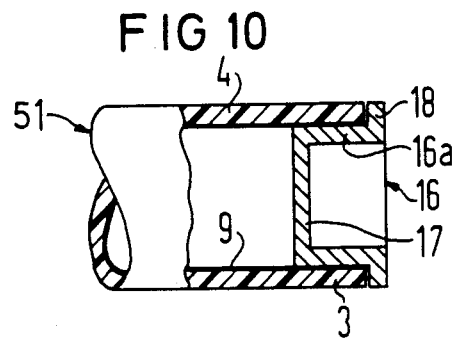

TERMINATING PART MADE OF SHRINKABLE MATERIAL FOR CLOSING OPEN ENDS AND CABLE FITTINGS, CONDUITS AND SOCKETS

BACKGROUND OF THE INVENTION

The present invention is directed to a terminal part or assembly which is made of synthetic material for closing a conduit opening of conduit systems, cable fittings and cable conduits, which terminal part has a sealed end which can be opened when required.

German Pat. No. 31 24 374 discloses a cable coupling box consisting of a metal housing which is sheathed in a cover made of shrinkable material. Conduit sockets are provided for the cable inlet and shrinkable covers are shrunk onto the cables which are introduced through the cable inlets. Since not all of the cable inlets or openings are always used, they are sealed initially with sealed caps which are made of a shrinkable material. When required, the ends of the caps are then cut off and the cables can be introduced through the opening formed by these cutoff ends with the remaining portion of the caps being shrunk down onto the cable to form a seal. However, when the caps are cut, considerable difficulties will occur at the cut edges during the subsequent shrinking operation because of the cut edges tending to tear.

SUMMARY OF THE INVENTION

The present invention is to provide a terminal part or assembly which is made of a heat-shrinkable material which is sealed at one end and which can be opened when required without risk of damaging the edges during a subsequent heat-shrinking of the part onto a member. The terminal part is prefabricated as a single assembly and is capable of being fitted on the opening with a minimum possible amount of work. Now, the given object is achieved with a terminal assembly or part of a type having a shrink tube having two end sections and an intermediate end section which can be heat-shrunk onto the conduit opening which may be a conduit socket, a part of a conduit system, or a fitting to close the opening in a sealed manner. The other end of the shrink tube is shrunk onto an end part that, when required, either can be removed or has an end wall which is removable without damaging the shrink tube and the assembly has at least one supporting element which is arranged inside of a portion of the shrink tube.

The invention is also directed to a method for using the terminal or assembly part so that its introduction of a member into an opening can be carried out in an uncomplicated manner. This object is achieved with a method in accordance with the invention in which an introduction opening is formed in the terminal assembly by removing the end part or a portion thereof to enable inserting the elongated object such as a cable. A portion of the shrink tube is then shrunk onto the elongated object by applying heat starting in a center area of the shrink tube and proceeding toward the end portion. During this shrinking operation, the remaining portion of the end part forms a supporting element which will remain until near the end of the method at which time it is expelled from the end portion of the tube.

Other advantages of the assembly and method over the known state of the art occur, in particular, from the fact that with the very simple method of fitting the prefabricated terminal assembly in accordance with the invention, the required reliability is obtained as regards to the end edges of the shrunk tube. Namely, by opening an appropriately designed end part, the end edges of the shrunk tube will not be damaged. This end part is inserted as a separate member inside of an end portion of the shrink tube and is first opened independently of the latter. These end parts, which can be manufactured either of a heat-shrinkable material or a non-deformable material, can be cut at the end or can be opened by other means. Since these end parts are no longer required during the remaining steps of introducing and securing, they can be removed. The end portion of the shrink tube is not involved in this preliminary securing or shrinking process. The shrinking operation is only started after introduction of the elongated object, such as a cable, and then at an end portion of the shrink tube which is already shrunk onto the conduit socket, fitting or conduit. As a result, the shrink tube is shrunk down onto the object introduced through the conduit socket in a progressive manner from the socket toward the free end. During this process, the fusion adhesive or heat-activated cement, which was applied on an inner wall, is activated and the remainder of the end part starts to float within the shrink tube. The end part is finally driven out of the free end portion of the shrink tube so that it can be removed after completion of the shrinking operation. This expulsion process is facilitated by giving the end part a tapered shape.

Other advantages, which occur with regard to the manufacture of such terminal parts, are that appropriate lengths of the shrink tubes can be used. These simple manufactured pieces of the shrink tube are then fitted with suitable short end parts to form the required terminal part or assembly.

BRIEF DESCRIPTION OF THE DRAWINGS

FIG. 5 is a partial end view of an embodiment of the terminal part or assembly with portions broken away for purposes of illustration;

FIG. 6 is a cross-sectional view of an initially formed end part for the terminal part of the present invention;

FIG. 7 is a longitudinal cross-sectional view through the end part of FIG. 6 after it has been expanded;

FIG. 8 is a longitudinal cross-sectional view of a variation of the end part of FIG. 7;

FIG. 9 is a partial side view with portions broken away illustrating an embodiment of the terminal assembly with the end part of FIG. 7 or FIG. 8;

FIG. 10 is a partial side view with portions broken away of another embodiment of the terminal assembly of the present invention with a cup-shaped end part;

DESCRIPTION OF THE PREFERRED EMBODIMENTS

Figure 1:
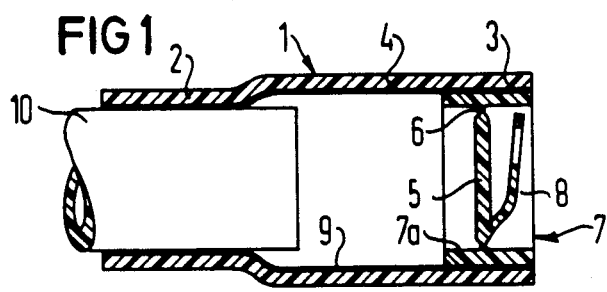
FIG. 1 is a longitudinal cross-sectional view of a terminal part or assembly with portions in elevation for purposes of illustration in accordance with the present invention.
Figure 3:
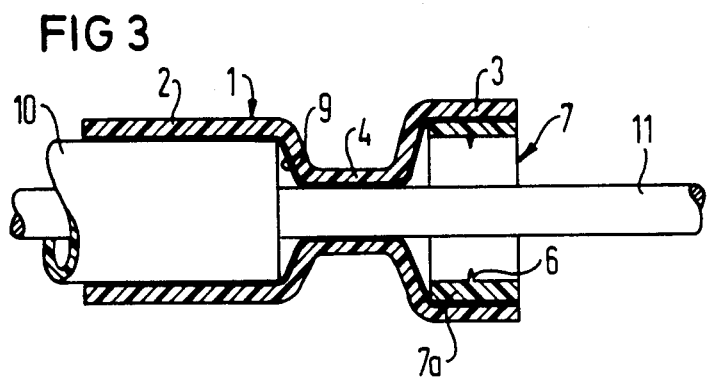
FIG. 3 is a longitudinal cross-sectional view with portions in elevation of the terminal part of FIG. 1 during the initial securing of an elongated object in the conduit.
Figure 4:
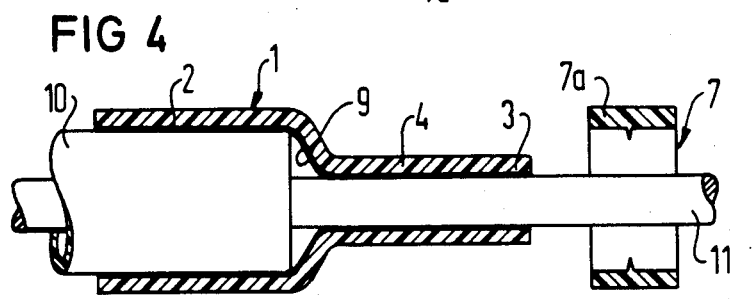
FIG. 4 is a longitudinal cross-sectional view of the terminal part of FIG. 3 at the completion of the assembly step.

The principles of the present invention are particularly useful when incorporated in a terminal part or assembly generally indicated at 1 in FIG. 1. The assembly or part 1 is illustrated as being assembled on the open end of a conduit or socket 10 of a housing, cable fitting or conduit system. As illustrated, the terminal part 1 will seal the open end of the socket 10 according to the present invention and enables easy access when required for introducing an elongated object such as a cable 11 (FIG. 3). However, the opening must be sealed again after the object 11 has been introduced and this is done by shrinking the remaining portion of the terminal assembly 1 onto the elongated object 11 as illustrated in FIGS. 3 and 4.

The terminal assembly or part 1 is composed of a shrink tube of heat-shrinkable material having end portions 2 and 3 interconnected by a center portion 4. In addition, the terminal part or assembly 1 includes an end part 7 which is a prefabricated part. The end part 7 contains a tubular or annular support element 7a and a breakout cover 5 in the form of an end wall that extends at right angles to the longitudinal axis. The breakout cover or part 5 is held in the supporting element 7a by means of a circumferential weakened zone which runs around an annular breakout line 6 and the part can either be pulled out or pressed inwardly to be released from the ring 7a. To this end, the breakout cover 5 is provided with a breakout lug or pull-tab 8 to facilitate the removal process. The inner surface of the shrink tube for each of the zones or portions 2, 3 and 4 is preferably coated with a layer 9 of heat-activated adhesive which serves to seal and secure the object which is subsequently introduced.

As illustrated in FIG. 1, the conduit socket 10 is not required at this time and is sealed with the terminal part 1 providing a damp-proof seal. The permeation-resistance can be further improved by covering the end walls of the end part with a permeation-proof material such as aluminum.

Figure 2:
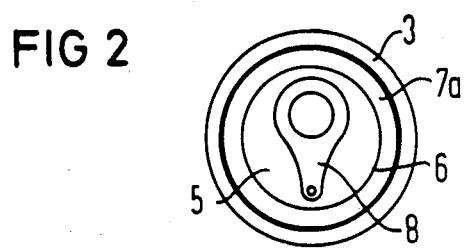
FIG. 2 is an end view of the terminal part of FIG. 1.

The sealed end of the terminal part 1 is best illustrated in FIG. 2 and the breakout cover 5 is clearly illustrated as being held in the supporting element 7a of the end part 7 by means of the weakened zone having an annular path 6. The lug or pull-tab 8 is illustrated and can be utilized to remove the end wall that forms the breakout cover 5.

When it is desirable to insert something into the opening of the socket 10, the breakout cover 5 is removed to leave only the annular tube or ring 7a as illustrated in FIG. 3. Then, an elongated object such as a cable 11 is inserted through the open end part and into the conduit 10. The next step is to obtain a seal around this inserted object 11 which is accomplished by starting to shrink the shrink tube onto the part 11 by acting on the intermediate portion 4 as illustrated in FIG. 3. By applying the heat in the intermediate portion or center zone 4, it will shrink down onto the elongated part 11 and the heat-sensitive adhesive will be activated to form a sealing engagement with the outer surface of the object 11.

In addition, the activation of the heat-sensitive adhesive 9 now causes the support element 7a of the remaining end part 7 to become detached from the shrink tube in the region of the sealed end 3 and start to float. Further shrinkage of the shrink tube from the center towards the open end will drive the remaining end part 7, which is already loose, so that it is finally expelled from the shrink tube as illustrated in FIG. 4. Here, the piece of the shrink tube is completely shrunk on the object 11 to form a seal therewith and the end part 7 is now exposed and can be subsequently removed.

It should be noted that the assembly portions have been confined to the inserted part 7 so that the sealing edges of the shrink tube are not affected in any way. The tearing of the sealing edge is thus avoided and the sealing action takes place over the whole area or surface of the shrink tube. In addition, the prefabricated terminal assembly 1 prepared for all assembly phases enables assembly to be carried out simply and reliably and the only tool that is necessary is the heat required for the shrinking operation. This uncomplicated terminal assembly 1 has also been found to meet every requirement with regard to sealing and mechanical strength.

An embodiment of the terminal part or assembly is generally indicated at 31 in FIG. 5 and includes the shrink tube having an end 3 which receives a detachable shrink cap 24. As illustrated, the shrink cap 24 includes a closed end member 22 which is shrunk on an annular support element 23. The shrink cap 24 composed in this manner is received in the end 3 of the shrink tube which is initially shrunk in an air-tight manner over the layer of heat-sensitive adhesive 9 to provide a seal. To open the terminal assembly 31, the end of a closed member 22 is cut off so that the elongated object such as the cable 11 of FIGS. 3 and 4 can be inserted into the shrink tube. The remaining steps of assembly are the same as those already described with regard to FIGS. 3 and 4 so that as the shrink tube is shrunk onto the object, the remaining portions of the shrink cap 24 such as the remaining portions of the closed end member 22 and the support 23 are expelled from the end 3 of the shrink tube. If the end member 22 is made of a suitable material which has adequate strength, then it will take over the supporting function and thus the shrink cap 24 will not need the additional annular supporting element or member 23. When the terminal part 31 is prepared, it is then expedient to shrink the piece of the shrink tube on a mandrel which had been inserted into the shrink cap 24 and after shrinking the shrink tube on the cap 24, the mandrel is removed.

Another embodiment of the terminal assembly or part is generally indicated at 41 in FIG. 9 and utilizes an end part or member 12' or 12''. The end part is initially formed as a part 12 which is cup-shaped and has a bottom forming an end wall 13 connected to an annular wall portion 12a that forms an annular supporting element. The annular wall or supporting element 12a at an end opposite the end wall 13 is connected to a flange ring 14 which is spaced by a ring-shaped or annular groove 15. This part 12 is formed by molding a crosslinkable plastic, for example, a long-density-polyethylene (LDPE). After the crosslinking, the part is expanded by a widening process into the end part 12' or 12'' of FIGS. 7 and 8. With the expanding, the end wall 13' of a larger diameter is provided and the annular supporting element 12a' is of a greater diameter. In addition, the flanged ring is expanded into a flange ring 14' that provides a larger annular groove 15' which enables its insertion onto an end 3 of the shrink tube as illustrated in FIG. 9. After insertion, heat is applied so that the annular flange ring 14' will shrink down onto the end 3 of the shrink tube and if desirable, a heat-sensitive adhesive layer 9 is provided on the inner surface of the flange 14' to form a seal between the part 12' and tube. In a modification illustrated in FIG. 8, the expansion creates a flange ring 14" which has a conical shape and thus produces a conical shape or tapering annular groove 15". This facilitates the introduction of the end part or member 12" onto the end 3 of the shrink tube.

When assembled with the shrink tube to form the terminal part 41 of FIG. 9, an opening can be formed in the end wall 13' either by a cutting operation or if the end piece 12' or 12" had weakening portions similar to the end part of FIG. 1 by breaking on a weakened portion. In either case, the opening is made without touching the shrink tube as in the previous embodiment.

Another embodiment of the terminal assembly or part is generally indicated at 51 in FIG. 10 and includes a shrink tube having one end 3 forming a seal with a cup-shaped end part 16. The cup-shaped end part 16 has an end wall 17 connected to an annular wall that forms a supporting element 16a which terminates in an annular stop 18. The annular stop 18 insures a firm fit in the end 3 of the shrink tube. Again, the end wall 17 can take the form of a breakout cover or other forms already described. The end part 16 can now be made of a non-deformable material. If a seal is required between the end part 16 and the shrink tube, the shrink tube will have a layer 9 of the meltable or heat-sensitive adhesive and is slightly shrunk onto the end cap or part 16. Alternatively, the end part 16 can also be made of material which remembers its shape and the seal is then obtained by expanding the end part 16 inside of the end of the shrink tube.

Figure 11:
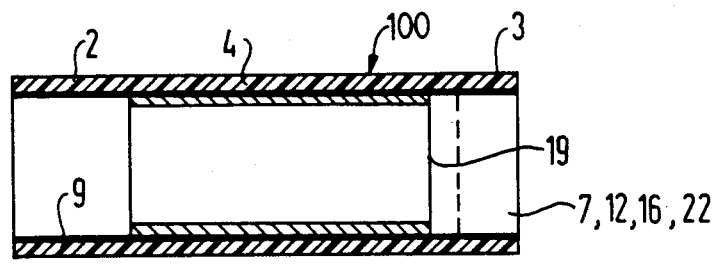
FIG. 11 is a longitudinal cross-sectional view of a terminal part or assembly with portions in elevation for purposes of illustration showing an additional supporting member or element.
Figure 12:
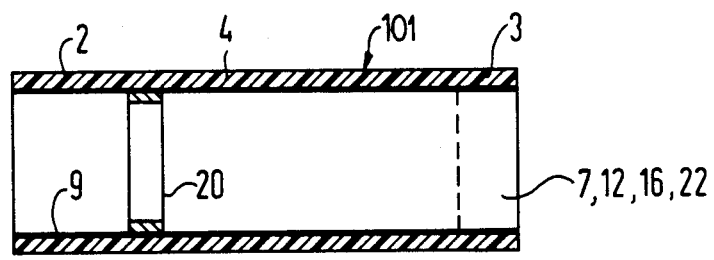
FIG. 12 is a longitudinal cross-sectional view similar to FIG. 11 showing a modification of the additional support member.
Figure 13:
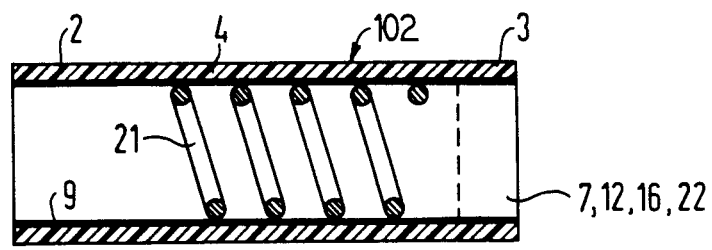
FIG. 13 is a longitudinal cross-sectional view similar to FIGS. 11 and 12 showing a third variation of an additional supporting element.

Three additional embodiments of the terminal assembly or part are indicated at 100, 101 and 102 in FIGS. 11, 12 and 13. In each of these embodiments, the terminal part is provided with further supporting elements 19, 20 or 21 in addition to the supporting elements formed by the end part which may either be an end part 7, 12', 12", 16 or 22. Further supporting elements are provided in the central region 4 of the shrink tube. The supporting elements are positioned in such a way that they can form a stop for the shrinkage of the connecting end 2 in each case and thus insure the correct fit. The support element 19 is a tube or tubular member while the support element 20 is a ring and the support element 21 is a spiral. Each of these support elements can be composed of widely differing materials and even composite materials are suitable for each supporting element. The first two supporting elements preferably are provided with a silicon coating so that they can be easily removed when the conduit opening is to be used. The ring-shaped supporting element 20 has the advantage that it can also be left in the inside of the shrink tube in certain circumstances. The ring-shaped supporting element 20 can also be formed as a spring washer, for example, which is fixed at an appropriate depth according to the requirements. It will also serve as a stop. A tearable piece of tape, for example, can be disposed transverse to the ring 20 to provide a stop for smaller diameter conduits as well. Initially, this serves as a stop during the assembly of the terminal assembly onto the conduit. When an elongated object is inserted, the tape is broken so that the object can be introduced fully into the opening of the conduit.

A spiral-shaped supporting element 21 of FIG. 3 is preferably designed or inserted in such a way that it can be pulled out. The supporting element inserted in a spiral may also consist, for example, of a tubular structure which was prestamped in a helical form so that the element can be pulled out in a spiral configuration. By way of a further variant, the spiral of meltable adhesive can be provided such that the supporting action collapses during the shrinking process. This means that the supporting element need no longer be removed. This further improves and simplifies the assembly. In this connection, it is also possible to use a supporting element which is formed by a tubular fabric member whose form of supporting action is lost when subjected to heat. The shrinking forces acting radially inwardly compress the fabric member particularly if it is a diagonally woven fabric member and the shrink tube can then be shrunk.

Finally, it should be pointed out that in all of the embodiments of FIGS. 11, 12 and 13, an end part will be required.

When the terminal assembly in accordance with the present invention is used, it is always possible to produce a termination for an opening in a conduit socket of a housing or conduit system and particularly for cable fittings or cable conduits by applying the terminal assembly. If an opening is now desired to enable insertion of an elongated object, an opening can be formed without cutting, tearing or touching the piece of the shrink tube which will be needed later for sealing the object in the opening. The elongated object is then introduced and fixed. Finally, the seal with the object, which has been introduced, is formed by shrinking the shrink tube first adjacent to the conduit opening, then towards the end of the shrinking tube. During this process, the remaining portions of the end part will be pressed out and can be removed.

Although various minor modifications may be suggested by those versed in the art, it should be understood that I wish to embody within the scope of the patent granted hereon, all such modifications as reasonably and properly come within the scope of my contribution to the art.

I claim:

1. A terminal assembly for sealingly closing an opening in a conduit and allowing forming a sealing closure on an elongated object inserted through the assembly into the opening, said assembly comprising a shrink tube, an end part with an end wall and a supporting element, said shrink tube being of heat-shrinkable material having one end adapted for being shrunk onto the conduit, the end part and the supporting element being received in the tube with the end part being located at the other end of the shrink tube to sealingly close said other end, said end wall being removable from said end part without damage to the shrink tube so that the remaining portions of the shrink tube can be shrunk onto an inserted elongated object to form a sealing closure therewith.

2. A terminal assembly according to claim 1, wherein the end wall has the form of a breakout member.

3. A terminal assembly according to claim 2, which includes a pull-tab connected to the breakout member to facilitate removal thereof.

4. A terminal assembly according to claim 2, wherein the breakout member is defined by an annular breakout line of a weakened portion of the end wall of the end part.

5. A terminal assembly according to claim 4, which includes a pull-tab connected to the breakout portion to aid removal thereof.

6. A terminal assembly according to claim 2, wherein the supporting element comprises an annular ring-shaped portion of the end part connected to the breakout portion.

7. A terminal assembly according to claim 1, wherein the end part includes a shrink cap having a closed end which forms the end wall and can be subsequently cut off without damaging the shrink tube.

8. A terminal assembly according to claim 7, wherein the wall strength of the end cap is sufficient to serve as the supporting element at least in the region of the other end of the shrink tube.

9. A terminal assembly according to claim 7, wherein the support element is an annular ring secured with the shrink cap to form the end part.

10. A terminal assembly according to claim 1, wherein the supporting element is arranged in a center region between the ends of the shrink tube.

11. A terminal assembly according to claim 10, wherein the supporting element has a form of a tubular member.

12. A terminal assembly according to claim 11, wherein an outer surface of the tubular member is provided with a silicon coating to facilitate removal of the tubular member from the shrink tube.

13. A terminal assembly according to claim 10, wherein the supporting element is an annular ring.

14. A terminal assembly according to claim 13, wherein said annular ring has an outer surface provided with a silicon coating to enable removal of the ring from the shrink tube.

15. A terminal assembly according to claim 10, wherein the supporting element has a form of a spiral.

16. A terminal assembly according to claim 15, wherein the spiral is removable.

17. A terminal assembly according to claim 15, wherein the spiral is made of a meltable adhesive.

18. A terminal assembly according to claim 15, wherein the spiral is formed by a helical cut in a tubular member.

19. A terminal assembly according to claim 1, wherein the shrink tube is made of a cross-linkable, shrinkable plastic, in particular, long-density-polyethylene (LDPE).

20. A terminal assembly according to claim 1, wherein the supporting element is in the form of a moldable tube of supporting fabric.

21. A terminal assembly according to claim 1, wherein the supporting element is a spring washer.

22. A terminal assembly according to claim 1, wherein said supporting element is an annular member having a small piece of tape extending transversely thereto to form a stop.

23. A terminal assembly according to claim 1, wherein the shrink tube has a cylindrical form.

24. A terminal assembly according to claim 1, wherein the shrink tube has a conical shape.

25. A terminal assembly according to claim 1, wherein the supporting element and end part are a single element.

26. A terminal assembly according to claim 25, wherein the support element is an annular wall connected to the end wall which is removable from said annular wall.

27. A terminal assembly according to claim 26, wherein the annular wall forming the support element has an annular stop.

28. A terminal assembly according to claim 27, wherein said end wall, annular wall and annular stop form a cup-shaped member having the annular stop as an outwardly extending flange.

29. A terminal assembly according to claim 26, wherein the annular wall and end wall form a cup-shaped member having a flanged ring at an outer end, said flanged ring forming an annular groove between an outer flange and support element.

30. A terminal assembly according to claim 29, wherein the end part is made of a material having a memory.

31. A terminal assembly according to claim 29, wherein the outer flange has a conical shape.

32. A terminal assembly according to claim 26, wherein a connection between the end wall and annular wall forms a breakout member, said breakout member being the only portion of the end part that is removed.

33. A terminal assembly according to claim 26, wherein the annular wall and the end wall can be removed as a whole member.

* * * * *